(12) United States Patent
Faris

(10) Patent No.: US 7,794,831 B2
(45) Date of Patent: *Sep. 14, 2010

(54) ANTI-REFLECTIVE COATING

(75) Inventor: Tom V. Faris, Pataskala, OH (US)

(73) Assignee: Vampire Optical Coating, Inc., Kirkersville, OH (US)

( * ) Notice: Subject to any disclaimer, the term of this patent is extended or adjusted under 35 U.S.C. 154(b) by 808 days.

This patent is subject to a terminal disclaimer.

(21) Appl. No.: 11/471,817

(22) Filed: Jun. 21, 2006

(65) Prior Publication Data

US 2006/0240232 A1     Oct. 26, 2006

Related U.S. Application Data

(63) Continuation-in-part of application No. 10/898,763, filed on Jul. 26, 2004, now Pat. No. 7,083,851.

(60) Provisional application No. 60/692,459, filed on Jun. 21, 2005, provisional application No. 60/490,658, filed on Jul. 28, 2003.

(51) Int. Cl.
*B32B 7/02* (2006.01)
*B32B 27/08* (2006.01)

(52) U.S. Cl. ............... 428/336; 428/323; 428/332; 428/447; 428/473.5

(58) Field of Classification Search ............ None
See application file for complete search history.

(56) References Cited

U.S. PATENT DOCUMENTS

| 4,798,773 A | 1/1989 | Yasukawa et al. |
|---|---|---|
| 4,855,199 A | 8/1989 | Bolon et al. |
| 5,202,412 A | 4/1993 | Auman et al. |
| 5,336,925 A | 8/1994 | Moss et al. |
| 5,344,916 A | 9/1994 | Harris et al. |
| 5,494,949 A | 2/1996 | Kinkel et al. |
| 5,536,584 A | 7/1996 | Sotokawa et al. |
| 5,536,792 A | 7/1996 | Hogan et al. |
| 5,856,018 A | 1/1999 | Chen et al. |
| 5,925,438 A | 7/1999 | Ota et al. |
| 5,969,088 A | 10/1999 | Ezzell et al. |
| 5,991,081 A | 11/1999 | Haaland et al. |
| 6,245,428 B1 | 6/2001 | Port et al. |
| 6,251,562 B1 | 6/2001 | Breyta et al. |
| 6,319,594 B1 * | 11/2001 | Suzuki et al. ............... 428/208 |
| 6,329,058 B1 | 12/2001 | Arney et al. |
| 6,389,215 B1 | 5/2002 | Lindsay et al. |
| 6,464,822 B1 | 10/2002 | Choi et al. |
| 6,583,935 B1 | 6/2003 | Saif et al. |
| 6,586,561 B1 | 7/2003 | Litt et al. |

(Continued)

FOREIGN PATENT DOCUMENTS

JP     11-12465 A     1/1999

(Continued)

*Primary Examiner*—Monique R Jackson
(74) *Attorney, Agent, or Firm*—Tarolli, Sundheim, Covell & Tummino LLP

(57) ABSTRACT

An anti-reflection coating comprising a first polymeric layer having a refractive index between about 1.64 and about 1.85 is disposed on a substrate. A second polymeric layer is also provided having a refractive index between about 1.29 and about 1.55, and overlies the first polymeric layer. An inorganic metal oxide layer 30 also overlies the first polymeric layer.

19 Claims, 2 Drawing Sheets

U.S. PATENT DOCUMENTS

| | | |
|---|---|---|
| 6,693,746 B1 | 2/2004 | Nakamura et al. |
| 6,746,730 B1 | 6/2004 | Tanioka et al. |
| 6,756,089 B2 | 6/2004 | Yoneya et al. |
| 7,083,851 B2 * | 8/2006 | Faris .......................... 428/323 |
| 7,294,395 B2 * | 11/2007 | Itoh et al. ................... 428/327 |
| 2002/0119304 A1 | 8/2002 | Arney et al. |

FOREIGN PATENT DOCUMENTS

JP   2001-348477 A   12/2001

* cited by examiner

ANTI-REFLECTIVE COATING

RELATED APPLICATIONS

The present application claims priority from U.S. Provisional Patent Application No. 60/692,459 filed Jun. 21, 2005 and is a continuation-in-part of U.S. patent application Ser. No. 10/898,763, filed Jul. 26, 2004 now U.S. Pat. No. 7,083,851 which claims priority from U.S. Provisional Patent Application No. 60/490,658, filed Jul. 28, 2003, herein incorporated by reference in its entirety.

FIELD OF THE INVENTION

The present invention relates to anti-reflection coatings, anti-reflection coated articles, and methods of making such coatings and articles.

BACKGROUND OF THE INVENTION

Transparent glass or plastic substrates (e.g., optical substrates) can experience a substantial loss of optical performance due to unwanted reflections from an air-substrate interface. When multiple interfaces are present within a display, the loss of viewing efficiency can substantially increase. The losses from the air-substrate interface can be described by the Fresnel equation:

$$((n_d-1)/(n_d+1))^2 * 100 = \% \text{ reflection}$$

In this equation $n_d$ represents the refractive index of the optical substrate and 1 represents the approximate refractive index of air.

This loss of optical performance becomes apparent when one tries to view an image or text through a transparent glass or plastic substrate, such as a cellular phone lens or a touch screen. In conditions of high ambient lighting, the surface reflection becomes so intense that one cannot readily view the text or the images through the transparent substrate.

Various solutions to this problem have been disclosed in the prior art. The most common of these is to coat the transparent substrate with a layer of material, which has a refractive index lower than that of the substrate, and an optical thickness of approximately one-quarter the wavelength of the light of interest. For instance, by coating a poly(ethylene terephthalate) (PET) film with a single layer (e.g., about 0.100 microns thickness) of gas phase deposited silicon dioxide ($SiO_2$), the percent reflectance can be decreased from about 5.75 percent per side to about 1.50 percent per side, with concomitant improvements in viewing efficiency. As the number of functional layers increases, the efficiency of these coatings also improves dramatically. The coatings go from being quite narrow in their performance characteristics to quite broad, as one goes from 2-layers to greater than 3-layers in an optical stack.

Traditionally, high performance anti-reflection films are comprised of: polyethylene terephthalate film with an abrasion resistant coated surface, followed by alternating layers of metallic oxides and silicon dioxide. It is typical that the total thickness of the sputtered layers will exceed about 200 nm. Anti-reflection films produced via this method exhibit excellent anti-reflection performance. However, the anti-reflection film is too expensive for many applications due to the relatively low processing rate, which is related to the total physical thickness that must be sputtered.

The outer surface of an anti-reflection film produced by this method is typically composed of silicon dioxide. Silicon dioxide exhibits extremely high surface energy and therefore is susceptible to mark-off from fingerprints and other stains. In addition, this high surface energy makes the silicon dioxide surfaces difficult to clean; thus, a thin lubrication layer (i.e. anti-fingerprint layer) is usually provided to the anti-reflection film's surface in a separate processing step. This added processing step adds to the cost of the film.

U.S. Pat. No. 6,464,822 assigned to 3M Innovative Properties Company teaches a process for providing anti-reflective coated articles. The patent discloses anti-reflection coated articles prepared by a combination of vacuum sputtering of metallic inorganic oxides followed by application of curable polymer coatings. The patent indicates that substantial improvements in production efficiencies are gained by the reduction in the total sputtered thickness. For example, the patent teaches an anti-reflection coated film, wherein the anti-reflective layers are comprised of about 20 nm of metal oxide, about 20 nm of silica and approximately 85 nm of a polymer outer layer—for a total sputtered thickness of about 40 nm. The patent discloses that in the production of films that parallel the performance of sputtered multi-layer films, the number of layers increases, as does the sputtered thickness. In this example, the physical thickness of the sputtered layers is between about 80 nm and about 160 nm, which results in the above-mentioned production inefficiency.

Modern electronic input devices, such as touch a panel, are comprised of two transparent electrodes separated by a thin space mounted in front of a display terminal. The rear electrode is typically rigid while the front electrode is flexible. As a rule, the more transparent these conductive electrodes are, the better. The most widely used transparent conductive oxide, Indium Tin Oxide (ITO), is very reflective when applied to the necessary conductivity. This results in reduced display performance due to the reflective losses generated within the touch panel. While the prior art indicates that these losses can be minimized via thin multi-layer dielectric stacks under the ITO layer, the reduction in production efficiencies are quite substantial.

U.S. Pat. No. 6,583,935 assigned to CPFilms, Inc. teaches a process whereby a high transmission transparent conductive metal oxide is formed that exhibits high transmission and low reflectance. The coated articles of reference are formed by vacuum deposition of several layers of inorganic oxide materials followed by a thin layer of a conductive metal oxide. For example, the patent teaches a high transmission ITO coated film comprised of about 28 nm of titanium dioxide, about 64 nm of silicon dioxide, and about 16 nm of ITO. Again, as the total physical thickness of the sputtered layers increases, the rate of production decreases from more than 5 meters per minute to less than 0.50 meters per minute with concomitant increases in cost.

SUMMARY OF THE INVENTION

The present invention relates to an anti-reflective coating or film. The anti-reflective coating comprises a first polymeric high refractive index layer having a refractive index between about 1.64 and about 1.85, a second polymeric layer having a refractive index between about 1.29 and about 1.55 overlying the first polymeric layer, and an inorganic layer overlying the first polymeric layer.

In an aspect of the present invention, the anti-reflective coating includes a first polymeric layer that is disposed on a substrate. The first polymeric layer has a refractive index between about 1.64 and about 1.85, and a thickness between about 20 nm and about 250 nm. The anti-reflective coating also includes a second polymeric layer. The second polymeric layer has a refractive index between about 1.29 and about 1.55. The anti-reflective coating further includes an inorganic layer that is interposed between the first polymeric layer and the second polymeric layer. The inorganic oxide layer has a thickness between about 5 nm and about 200 nm.

In another aspect of the present invention, the anti-reflective coating includes a first polymeric layer that is disposed on a substrate. The first polymeric layer has a refractive index between about 1.64 and about 1.85, and a thickness between about 20 nm and about 250 nm. The anti-reflective coating also includes an inorganic layer. The inorganic layer has a thickness between about 5 nm and about 200 nm. The anti-reflective coating further includes a second polymeric layer that is interposed between the first polymeric layer and the inorganic layer. The second polymeric layer has a refractive index between about 1.29 and about 1.55.

BRIEF DESCRIPTION OF THE DRAWING

Further features of the present invention will become apparent to those skilled in the art to which the present invention relates from reading the following description of the invention with reference to the accompanying drawing in which.

DETAILED DESCRIPTION

Figure 1:
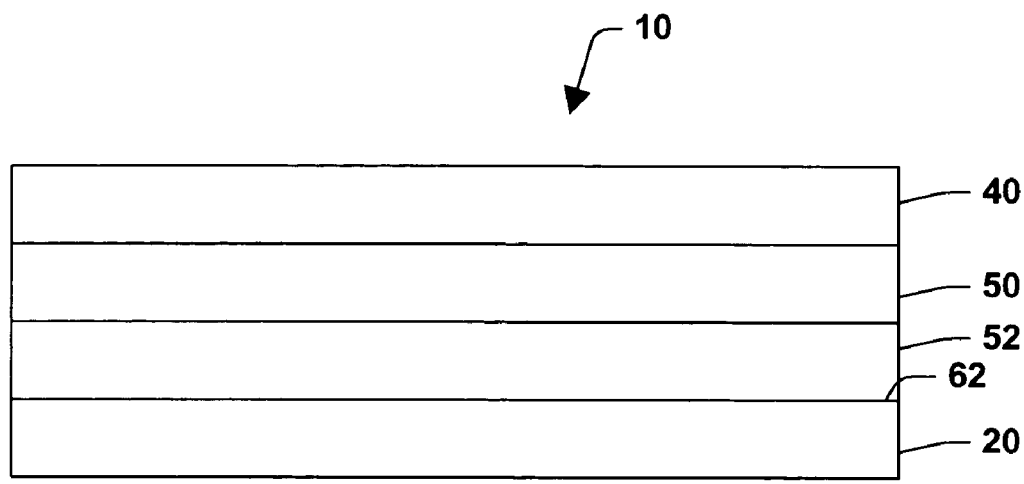
FIG. 1 is a cross-sectional view of a first embodiment of the present invention.

The present invention relates to a transparent anti-reflective film or coating. By transparent it is meant the anti-reflective coating or film allows a percentage of light in at least one of the visible, infrared, or ultraviolet wavelength range to pass through the coating.

The anti-reflective coating is capable of imparting excellent anti-reflective properties to the surfaces of substrates. The substrate can be, for example, a finished optical lens, the display surface of a cathode ray tube (CRT), an instrument cluster lens, such as those used in automobiles, lenses for personal communication, touch panels or gaming devices, or a film which may be laminated to the surface of a flat panel display. The substrate can be at least partially transparent or at least partially opaque depending on the desired use. Typically, the substrate will include polycarbonate, PMMA resins, polycarbonate-polyester blends, poly (methyl methacrylate), triacetylcellulose and polyethylene terephthalate, and generally is in the form of rigid sheets or flexible films. However, it is understood that the substrate can be manufactured or otherwise formed into something other than rigid sheets or flexible films. Furthermore, the anti-reflective coating can be provided on the surface of an abrasion resistant coating, or film, which is provided on the substrate.

The anti-reflective coating includes a polymeric high refractive index layer, a polymeric low refractive index layer with a refractive index less than the high refractive index layer, and an inorganic layer. The high refractive index layer is disposed on the substrate. The low refractive index layer and the inorganic layer overlie the high refractive index layer.

Additionally, by providing a high refractive index layer, having a controlled refractive index and thickness, disposed between the substrate (e.g., surface of an abrasion resistance coating) and the inorganic layer, an anti-reflective coating with excellent performance is produced. This also allows for a reduction in the physical thickness of the inorganic layer; therefore, allowing for a substantial reduction in the cost of such high performance anti-reflective coated films.

The polymeric high refractive index layer, at the proper thickness and refractive index, acts as a buffer layer in the anti-reflection design. It is capable of broadening the range of wavelengths over which the anti-reflective coating performs. This buffer layer greatly reduces the amount of inorganic material (e.g., inorganic oxides) that must be provided on the film or substrate, which results in concomitant gains in production efficiency.

By way of example, an anti-reflective coating in accordance with the present invention can include about 102 nm of the high refractive index polymeric layer, about 20 nm titanium dioxide, and about 103 nm of a UV curable coating material with a refractive index lower than the refractive index of the high refractive index polymer layer. As compared to traditional vacuum sputtered anti-reflection films, the reduction in sputtered thickness is a factor of at least about 10 times. Additionally, the sputtered thickness can be at least about half the sputtered thickness of coatings described by 3M in U.S. Pat. No. 6,464,822, while gaining substantial improvements in the performance of the resulting anti-reflection coated articles.

FIG. 1 illustrates an anti-reflective coating 10 in accordance with a first aspect of the invention provided on a substrate 20. The substrate can be, for example, an optical substrate, such as a finished optical lens, display surface of a CRT, an instrument cluster lens, and a lens for a personal communication device.

The anti-reflective coating 10 includes an inner polymeric high refractive index layer 30, an outer polymeric layer 40 with a refractive index less than the high refractive index layer 30, and an inorganic layer 50 interposed between the outer polymeric layer 40 and the inner refractive index layer 30. The inorganic layer 50 may or may not be conductive.

The high refractive index layer 30 extends substantially parallel to a surface 52 of the substrate 20. Although FIG. 1 illustrates that the area of the high refractive index layer 30 is substantially equal to the area of the underlying substrate 20; the high refractive index layer 30 need only cover at least a portion of the substrate 20.

The high refractive index layer 30 of the anti-reflective coating 10 comprises a polymeric layer that has a refractive index of between about 1.64 and about 1.85 at a wavelength of about 680 nm. The high refractive index layer 30 can selectively absorb infrared radiation, selectively transmit visible light, and exhibit very low surface resistivity.

The high-refractive index layer 30 can have a thickness of about 5 nm to about 200 nm. It will be appreciated, however, that the thickness of the high refractive index layer 30 can fall outside this thickness range depending on the desired use of the layer.

The high refractive index layer 30 can be formed from a polymer material of high refractive index, such as disclosed in U.S. patent application Ser. No. 60/490,658, which is herein incorporated by reference in its entirety. U.S. patent application Ser. No. 60/490,658 discloses polymers that can include a polyelectrolyte with a main polymer chain. The main polymer chain comprises aromatic groups and nitrogen atoms (e.g., amide groups or amine groups) as well as multiple ionizable radicals. The number of aromatic groups and nitrogen atoms provided in the main polymer chain is such that the polyelectrolyte can have an inherently high refractive index, for example, of at least about 1.64 at a wavelength of about 680 nm. The inherently high refractive index of the polyelectrolyte can also be accomplished by the inclusion of bromine, sulfur, and/or fluorine in the polyelectrolyte. The aromatic groups, nitrogen, bromine, sulfur, and/or fluorine can be included in monomers that are polymerized to form repeating units of the polyelectrolytes. Examples of monomers are those that include aromatic moieties that are arranged in a coplanar manner in the main polymer chain upon formation of the polyelectrolyte.

Examples of polyelectrolytes that can be used in accordance with the present invention can include polyamic acids and/or polyamic acid derivatives, such as polyamic acid esters and polyamic acid salts. These esters and salts are soluble in polar solvents, and particularly soluble in polar aprotic solvents. The polyamic acid, polyamic acid ester, and/or polyamic acid salt can comprise repeating units that include aromatic groups, amide groups, and/or carboxylic acid groups and that have an inherently high refractive index that can be greater than about 1.64 at a wavelength of about 680 nm. This inherently high refractive index allows the polyamic acid, polyamic acid ester, and/or polyamic acid salt to form upon partial condensation a polyimide that has a refractive index of at least about 1.68 at a wavelength about 680 nm. For example, the polyimide has a refractive index greater than about 1.70 at a wavelength of about 680 nm.

By way of example, the polyamic acid, polyamic acid ester, and/or polyamic acid salt can be formed by reacting diamine monomers and dianhydride monomers. The diamine monomers and dianhydride monomers can include aromatic groups, nitrogen, bromine, sulfur, and/or fluorine. Examples of diamines that can be used to form the polyamic acid, polyamic acid ester, and/or polamic acid salt include diamines in which all of the aromatic groups are arranged in a substantially co-planar manner. Such diamines can include, for example, p-phenylene diamine, m-phenylene diamine, 3,3'-bis (trifluoromethylbenzidine), 2,2'-bis (trifluoromethylbenzidine), o-tolidine, 4,4'-diamino 2,2'-dichlorodimethyl biphenyl, 4,4' oxydianiline, o-tolidine sulfone, 4,4' diaminodiphenyl sulfide, and combinations thereof. Examples of dianhydrides that can be used to form the polyamic acid, polyamic acid ester, and/or polyamic acid salt include 3,3',-4,4'-benzophenone tetracarboxylic dianhydride, pyromellitic dianhydride, 3,3'4,4' biphenyltetracarboxylic dianhydride, 2,2'-bis-(3,4 dicarboxyphenyl)hexafluoropropane dianhydride, 4,4' oxydiphthalic anhydride, DSDA, 4,4' bisphenol A dianhydride, and hydroquinone diphthalic anhydride.

It will be appreciated by one skilled in the art that other diamines and/or dianhydrides can be used to form the polyamic acid, polyamic acid ester, and/or polyamic acid salt in accordance with the present invention. Examples of such diamines and/or dianhydrides can be selected from the diamines and dianhydrides disclosed in U.S. Pat. No. 5,344,916, herein incorporated by reference in its entirety. Moreover, it will be appreciated that other compounds besides diamines and dianhydrides can be used to form the polyamic acids, polyamic acid esters, and polyamic acid salts in accordance with the present invention. These other compounds can include, for example, other amines, anhydrides, and carboxylic acids, as well as polymers, such as poly(vinyl carbazole).

Optionally, the high refractive index layer 30 can include a plurality of uniformly dispersed colloidal particles, such as colloidal conductive oxide particles, colloidal infrared radiation absorbing or reflecting particles, and/or colloidal high refractive index particles. The colloidal oxide particles can be used to modify (i.e., increase or decrease) the refractive index of the high refractive index layer 30, as well as modify other properties, such as infrared absorption and light transmissivity. These colloidal particles can have an average particle size between about 1 nm and 1 micron (e.g. an average particle size less than about 100 nm). The colloidal particles and the high refractive index polymer can form a composite polymeric layer (i.e., ceramer) or a composite high refractive index layer 30.

The colloidal particles can include, for example, inorganic oxides and/or metal oxides, such as silicon oxides, aluminum oxides, titanium oxides, zinc oxides, germanium oxides, indium oxides, tin oxides, zirconium oxides, antimony oxides and/or combinations thereof. The amount of colloidal particles that can be provided in the high refractive index layer 30 can be between about 5.0 weight percent and about 95.0 weight percent based on the solids of the high refractive index layer 30.

The high refractive index layer 30 can further include other additives. An example of such an additive includes a flow control additive (e.g., fluoro surfactant) to promote processing and leveling.

The high refractive index layer 30 can be provided on the substrate 20 in the form of a uniform layer by typical polymeric processing techniques. Examples of such techniques include gravure coating, dip coating, or spin coating. An example of one technique is a gravure coating technique, which employs a reverse, kiss gravure coating method, such as a MicroGravure® coating technology.

The inorganic oxide layer 50 is disposed on the high refractive index layer 30 and extends substantially parallel to the high refractive index layer 30 and the surface 52. Although the area of the inorganic oxide layer 50 is illustrated as being substantially equal to the area of the underlying high refractive index layer 30; the inorganic oxide layer 50 need only cover at least a portion of the high refractive index layer 30.

The inorganic layer 50 of the anti-reflective coating 10 can have a refractive index that is higher than the refractive index of the high refractive index layer 30, and a substantially uniform thickness of about 5 nm to about 200 nm, for example, about 5 nm to about 35 nm. The inorganic layer 50 can be formed from any inorganic materials (e.g., metal oxides) that are used to produce anti-reflection coated articles. Examples of inorganic materials include inorganic oxides, such as indium oxide, titanium oxide, zirconium oxide, bismuth oxide, hafnium oxide, antimony oxide, tin oxide, tantalum oxide, zinc oxide, cadmium oxide, gallium indium oxide, niobium pentoxide, indium tin oxide, tin dioxide, silicon dioxide ($SiO_x$), and mixtures thereof. The inorganic oxide can also be titanium dioxide used alone or in combination with other metal oxides. The inorganic layer can also be formed from other inorganic materials, such as magnesium fluoride.

The inorganic layer 50 can be provided over the high refractive index layer 30 by depositing an inorganic oxide onto the high refractive index layer 30 using conventional deposition techniques, such as vapor phase deposition. Examples of vapor phase deposition techniques that can be employed to deposit the inorganic layer 50 on the high refractive index layer 30 include sputtering, physical vapor deposition, and chemical vapor deposition. It will appreciated that other deposition methods of providing the inorganic layer 50 on the high refractive index layer 30 can also be employed.

The low refractive index layer 40 is disposed on the inorganic layer 50 and extends substantially parallel to the inorganic layer 50, the high refractive index layer 30, and the surface 52 of the substrate 20. Although the area of the low refractive index layer 40 is illustrated as being substantially equal to the area of the underlying inorganic layer 50; the low refractive index layer 40 need only cover at least a portion of the inorganic layer 50.

The low refractive index layer 40 has a refractive index that is lower than the refractive index of the high refractive index layer 30 and can be substantially lower than a refractive index of about 1.64 at a wavelength of about 680 nm. By way of example, the low refractive index layer 40 can have a refractive index between about 1.29 and about 1.55 at a wavelength of about 680 nm (e.g., about 1.35 to about 1.55 nm at a wavelength of about 680 nm).

The low refractive index layer 40 has a thickness of about 5 nm to about 200 nm. It will be appreciated, however, that the thickness of the low refractive index layer 40 can be outside this thickness range depending on the desired use of the layer. Regardless, the thickness used is such that the layer 40 is effective in providing an anti-reflective film to the coating 10.

The low refractive index layer 40 can include, for example, an actinic radiation curable material, such as a UV curable fluorinated acrylate polymer or a fluorinated polymer layer (e.g., Teflon AF®, Cytop®, or Certonal®), that dries by evaporation and leaves behind a low refractive index layer 40 of suitable thickness for the desired performance. The actinic radiation curable material can have a refractive index between about 1.35 and about 1.55. Very durable low cost anti-reflective coatings can be made by utilizing purely apiphatic (meth) acrylate cross-linked oligomers. The low refractive index layer 40 is composed of commercially available UV curable materials such that the best combination of production efficiency and performance can be readily achieved. However, the low refractive index layer 40 can alternatively be comprised of an air dry aliphatic resin, such as polyurethane, alkyd resins, or polymeric acrylates. Additionally, the low refractive index layer 40 can be coated with a thin reactive fluoro-silicone layer (not shown) to improve the coating's 10 resistance to staining, marking, and fingerprints.

It will be appreciated by one skilled in the art that other polymers, such as a cross-linked thermally curable silicone based coating composition (e.g., SDC Silvue® 100 or 200 or other equivalent products coated at a thickness between about 40 nm and about 130 nm) can be used to form the low refractive index polymeric layer 40.

The low refractive index layer 40 can be provided on the inorganic oxide layer 50 using conventional coating techniques that can apply the layer 40 at the proper thickness and with a high efficiency. Examples of such coating techniques include gravure coating, dip coating, spray coating, or spin coating. It will be appreciated that other coating techniques can also be used to dispose the polymeric layer 40 over the inorganic oxide layer 50.

In an illustrative example of an anti-reflective coating 10 in accordance with the first aspect of the invention, the polymeric high refractive index layer 30 can have a thickness between about 90 nm and about 110 nm and be interposed between an abrasion resistant coated surface 20 and a thin layer of vapor phase deposited inorganic oxide 50 with a thickness between about 5 nm and about 45 nm. An actinic radiation curable coating layer 40 that provides good fingerprint and stain resistance can be coated over the inorganic oxide layer 50 at a thickness between about 90 nm and about 110 nm. Anti-reflection coated articles produced via this method exhibit excellent anti-reflection properties in combination with low costs of production.

Figure 2:
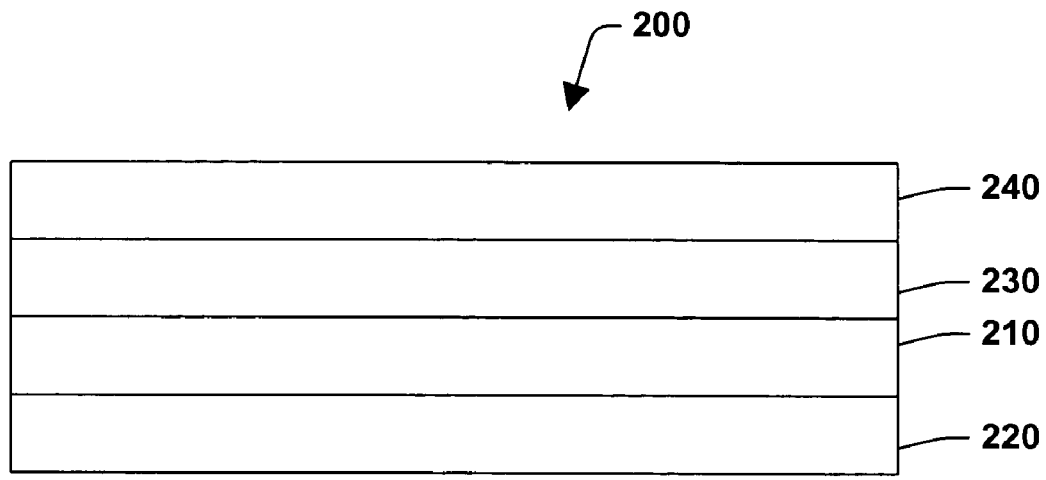
FIG. 2 is a cross-sectional view of a second embodiment of the present invention.

FIG. 2 illustrates an anti-reflective coating in accordance with another aspect of the invention. The coating 200 is substantially identical to the coating 10 except that the orientation of the inorganic layer relative to the low refractive index layer is reversed. In this embodiment, the high refractive index layer 210 is disposed on the substrate or film 220, the low refractive index layer 230 is disposed on the high refractive index layer 210, and the inorganic layer 240 is disposed on the low refractive index layer 230, forming an anti-reflective coating 200. Fabrication and deposition techniques and methods substantially identical to those employed to form the anti-reflective coating 10 can be used to form the coating 200.

In an illustrative example of the second aspect of the present invention, the polymeric high refractive index layer 210 can have a thickness between about 55 nm and about 75 nm and be interposed between an abrasion resistant coated surface 220 and a thin low refractive index actinic radiation curable layer 230 with a thickness between about 35 nm and about 55 nm. A thin layer of vapor phase deposited conductive metal oxide 240 is disposed on the low refractive index layer 230 at a thickness between about 5 nm and about 100 nm, such that, the low index polymer layer 230 is interposed between the high refractive index layer 210 and the thin metal oxide layer 240. Transparent conductive oxide coated articles produced via this method exhibit excellent transmission, low reflectance and low production costs.

The following examples are included to demonstrate various aspects of the invention. Those of skill in the art should, in light of the present disclosure, appreciate that many changes can be made in the specific aspects which are disclosed and still obtain a like or similar result without departing from the spirit and scope of the invention.

EXAMPLES

Example 1

An anti-reflective coating in accordance with the present invention was prepared by coating a 75-micron polyethylene terephthalate film with an actinic radiation curable coating composition, commercially available from Vampire Optical Coatings, Inc. as IM-002. The coating was dried and cured in air with UV radiation to a dry coating thickness between 2.50 and 2.80 microns.

A liquid coating composition comprising the high refractive index layer was prepared having the following composition:

| Component: | weight (grams) |
| --- | --- |
| Poly (amic acid) | 41.08 |
| Hx-305M1 nano-particles | 158.10 |
| Dimethyl formamide | 2775.0 |
| Cyclohexanone | 700.0 |
| Methanol | 351.90 |

This composition was applied to the surface of the abrasion resistant coated film using a 180 MicroGravure® coating rod turning at 76 rpm, dried in air and cured to yield a dry coating between 96 nm and 104.2 nm thickness, which exhibits excellent adhesion. This composition yielded a dry coating which contains approximately 80.0 weight-percent high refractive index nano-particles. In addition, the dry coating exhibited a refractive index of 1.7910 at 550 nm and 1.7503 at 700 nm.

A thin layer, of 19.83 nm thickness, of titanium dioxide was sputtered onto the surface of the high refractive index polymeric coating using typical setup and processing conditions know to those skilled in the art of vapor phase deposition of metal oxides. This layer exhibited excellent adhesion to the underlying layers.

A liquid coating composition comprising the low refractive index layer was also prepared having the following composition:

| Component: | weight (grams) |
|---|---|
| Dipentaearythritol pentaacrylate (SR399) | 194.65 |
| Acrylic acid | 34.35 |
| Darocur 1173 | 13.74 |
| Zonyl 8857A | 3.44 |
| N-propyl alcohol | 4251 |

Figure 3:
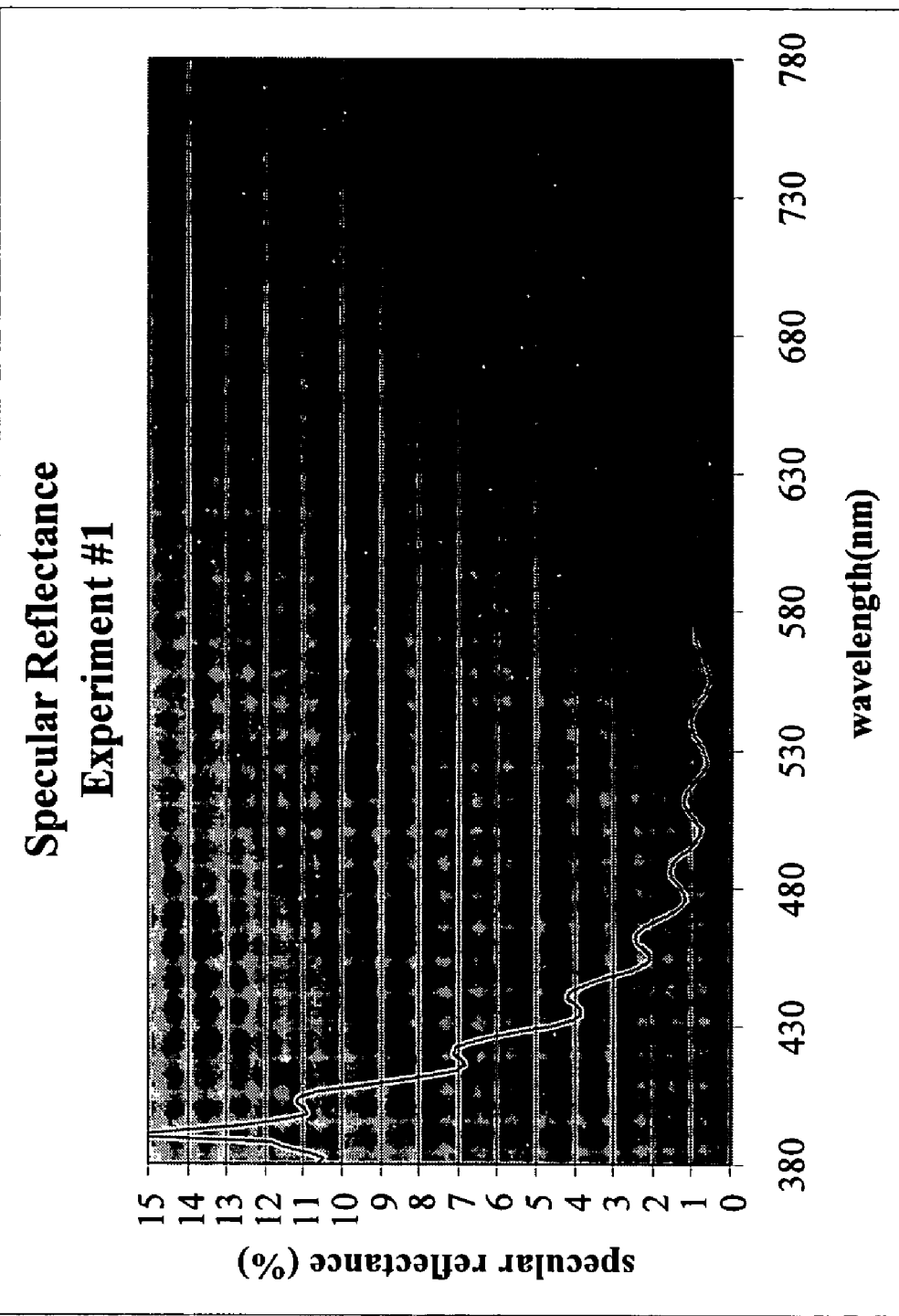
FIG. 3 is a plot illustrating the specular reflectance of the anti-reflective coating of Example 1.

This composition was then applied to the metal oxide layer using a 180 MicroGravure® coating rod turning at 76 rpm, dried and cured with a 400 Watt per inch ultraviolet lamp in air resulting in a dry coating thickness between 100 nm and 105 nm. The coating layer exhibited good adhesion, resists abrasion with #0000 steel wool, had a pencil hardness of 3H, an advancing water contact angle between 85 and 95 degrees, light transmission greater than 94.0 percent, a minimum reflectance of 0.425 percent at 625 nm, and an average specular reflectance (450 to 675 nm) of 0.925 percent as shown in FIG. 3.

Examples 2-4

Anti-reflective coatings were prepared in accordance with Example 1 except the thickness of the high refractive index layer, the metal oxide layer and the low refractive index layer was varied as shown in TABLE 1. The reflected intensity, average specular reflectance and percent transmission of light for Examples 2-4 are listed in TABLE 1.

Comparative Examples 5-6

An anti-reflective coating (Comparative Example 5) having a construction similar to Example 1 without an inorganic layer was prepared. The reflected intensity, average specular reflectance and percent transmission of light for Example 5 as well for a substrate with out a coating (Comparative Example 6) are in TABLE 1

TABLE 1

ANTI-REFLECTION COATING RESULTS

| Ex. # | HIP thickness (nm) | TiO2 (nm) | Outer layer (nm) | Reflected Intensity (Y) | Average reflectance (450 to 675) | % Light transmission |
|---|---|---|---|---|---|---|
| 1 | 102 | 19.83 | 102 | 0.77% | 0.925 | >94.0% |
| 2 | 85 | 24.0 | 90 | 1.00% | — | — |
| 3 | 98 | 16.6 | 110 | 0.80% | 0.910 | >94.0% |
| 4 | 98 | 13.6 | 94 | 0.98% | 1.10 | >93.0% |
| 5 | 85 | 0.00 | 90 | 1.35% | 1.65 | >92.5% |
| 6 | 0.00 | 0.00 | 0.00 | 5.50% | 5.50% | >88.0% |

Example 7

An anti-reflective coating in accordance with the present invention was prepared from the following high refractive index layer coating composition:

| Component: | weight (grams) |
|---|---|
| Poly (amic acid) | 89.76 |
| Hx-305M1 nano-particles | 405.00 |
| Dimethyl formamide | 3051.00 |

-continued

| Component: | weight (grams) |
|---|---|
| Methanol | 810.00 |
| MEK | 1500.00 |

This composition was applied to the surface of a commercially abrasion resistant coated film using a 230 MicroGravure® coating rod turning at 72 rpm, dried in air and cured to yield a dry coating between 66 nm and 68 nm thickness, which exhibited excellent adhesion. This composition yielded a dry coating which contained approximately 82.0 weight-percent high refractive index nano-particles.

A liquid coating composition comprising the low refractive index layer was also prepared having the following composition:

| Component: | weight (grams) |
|---|---|
| Dipentaearythritol pentaacrylate (SR399) | 23.10 |
| Acrylic acid | 34.65 |
| Darocur 1173 | 15.00 |
| Nanocryl P270 | 92.50 |
| 1,3,5 tris(acryloxyethyl)isocyanurate | 100.00 |
| Methyl Ethyl Ketone | 205.00 |
| N-Propyl Alcohol | 3771.00 |

This composition was applied to the high refractive index layer using a 230 MicroGravure® coating bar turning at 76 rpm, dried and cured using a 400 Watt per inch UV lamp to yield a dry coating thickness between 32 nm and 35 nm with excellent adhesion.

A thin layer of indium tin oxide with a thickness of 32 nm to 33 nm was then deposited via sputtering onto the low index polymer layer above to yield a conductive film with excellent optical (>88 percent transmission), physical, and electronic properties (200 Ohm per square surface resistivity) as shown in Table 2.

Comparative Examples 8-9 and Example 10

Anti-reflective coating (Example 10) was prepared in accordance with Example 7 except the thickness of the high refractive index layer, the metal oxide layer and the low refractive index layer was varied as shown in TABLE 2. The surface resistivity and the optical transmission for Example 10 is listed in TABLE. The surface resistivity and the optical transmission for substrates without a coating (Comparative Examples 8-9) are also listed in TABLE 2.

TABLE 2

ANTI-REFLECTION COATING RESULTS (TCO)

| Exp # | HIP thickness (nm) | Low Index (nm) | ITO (nm) | Surface Resistivity (Ohms/sq) | % Light transmission (550 nm) |
|---|---|---|---|---|---|
| 7 | 65 | 35 | 33 | 200 | 89.0% |
| 8 | — | — | 33 | 200 | 83.0% |
| 9 | — | — | 22 | 300 | 85.0% |
| 10 | 75 | 45 | 22 | 300 | >91.0% |

From the above description of the invention, those skilled in the art will appreciate improvements, changes, and modifications. Such improvements, changes and modifications can include are intended to be covered by the appended claims. For example, those skilled the art would appreciate the anti-reflective coating can comprise a plurality of alternating low-refractive index layers and high-refractive index layers formed over a substrate, with inorganic metal oxide layers interposed therebetween.

What is claimed:

1. An anti-reflection coating comprising:
a first polymeric layer having a refractive index between about 1.64 and about 1.85, the first polymeric layer being disposed on a substrate, the first polymeric layer comprising a polyelectrolyte, the polyelectrolyte including a plurality of aromatic groups and nitrogen atoms in a main polymer chain, all the aromatic groups in the main polymer chain being arranged in a substantially coplanar manner, the polyelectrolyte having a refractive index of at least about 1.64 at a wavelength of about 680 nm;
a second polymeric layer having a refractive index between about 1.29 and about 1.55 overlying the first polymeric layer; and
an inorganic layer overlying the first polymeric layer.

2. The coating of claim 1, the inorganic layer having a thickness between about 5 nm to about 200 nm.

3. The coating of claim 1, the first polymeric layer comprising a plurality of uniformly dispersed colloidal particles.

4. The coating of claim 1, the polyelectrolyte being formed from a dianhydride.

5. The coating of claim 1, the second polymeric layer comprising an actinic radiation curable composition, the actinic radiation curable composition having a refractive index between about 1.35 and about 1.55.

6. The coating of claim 1, the second polymeric layer comprising at least one of a fluorinated material or an air-dry aliphatic resin.

7. The coating of claim 1, the inorganic layer comprising a sputtered inorganic material.

8. The coating of claim 1, the second polymeric layer being coated with a reactive fluoro-silicone layer.

9. The coating of claim 1, the oxide layer having a refractive index that is higher than the refractive index of the first polymeric layer.

10. The coating of claim 1, the inorganic layer comprising at least one oxide selected from the group consisting of titanium dioxide, indium tin oxide, zirconium oxide, bismuth oxide, hafnium oxide, antimony oxide, tin oxide, tantalum oxide, indium oxide, niobium pentoxide, zinc oxide, and mixtures thereof.

11. The coating of claim 1, the inorganic layer being interposed between the first polymeric layer and the second polymeric layer.

12. The coating of claim 1, the second polymer layer being interposed between the inorganic layer and the first polymeric layer.

13. An anti-reflection coating comprising:
a first polymeric layer having a refractive index between about 1.64 and about 1.85, and further having a thickness between about 20 nm and about 250 nm, the first polymeric layer being disposed onto a substrate, the first polymeric layer comprising a polyelectrolyte formed from a dianhydride, the dianhydride including a plurality of aromatic groups arranged in a substantially coplanar manner and all the aromatic groups in a main polymer chain of the polyelectrolyte arranged in a substantially coplanar manner and all the aromatic groups in a main polymer chain of the polyelectrolyte arranged in a substantially coplanar manner;
a second polymeric layer having a refractive index between about 1.29 and about 1.55; and
an inorganic layer having a thickness between about 5 nm and about 200 nm, and further having a refractive index higher than the first polymeric layer, the inorganic layer being interposed between the first polymeric layer and the second polymeric layer.

14. The coating of claim 13, the polyelectrolyte including a plurality of aromatic groups and nitrogen atoms in a main polymer chain, the polyelectrolyte having a refractive index of at least about 1.64 at a wavelength of about 680 nm.

15. The coating of claim 13, the inorganic layer comprising a sputtered inorganic material.

16. The coating of claim 15, the inorganic layer comprising at least one oxide selected from the group consisting of titanium dioxide, indium tin oxide, zirconium oxide, bismuth oxide, hafnium oxide, antimony oxide, tin oxide, tantalum oxide, indium oxide, niobium pentoxide, zinc oxide, and mixtures thereof.

17. An anti-reflection coating comprising:
a first polymeric layer having a refractive index between about 1.64 and about 1.85 at a wavelength of about 680 nm, and further having a thickness between about 20 nm and about 250 nm, the first polymeric layer comprising a polyelectrolyte formed from a dianhydride, the dianhydride including a plurality of aromatic groups arranged in a substantially coplanar manner, all the aromatic groups in a main polymer chain of the polyelectrolyte arranged in a substantially coplanar manner, the first polymeric layer being disposed onto a substrate;
an inorganic layer having a thickness between about 5 nm and about 200 nm, and further having a refractive index higher than the first polymeric layer; and
a second polymeric layer having a refractive index between about 1.29 and about 1.55, the second polymeric layer being interposed between the first polymeric layer and the inorganic layer.

18. The coating of claim 17, the polyelectrolyte including a plurality of aromatic groups and nitrogen atoms in a main polymer chain, the polyelectrolyte having a refractive index of at least about 1.64 at a wavelength of about 680 nm.

19. The coating of claim 17, the inorganic layer comprising at least one sputtered metal oxide selected from the group consisting of titanium dioxide, indium tin oxide, zirconium oxide, bismuth oxide, hafnium oxide, antimony oxide, tin oxide, tantalum oxide, indium oxide, niobium pentoxide, zinc oxide, and mixtures thereof.

* * * * *